Dec. 19, 1961 V. G. SHARPE ET AL 3,013,406
REFRIGERATING APPARATUS
Original Filed Jan. 16, 1956 5 Sheets-Sheet 3
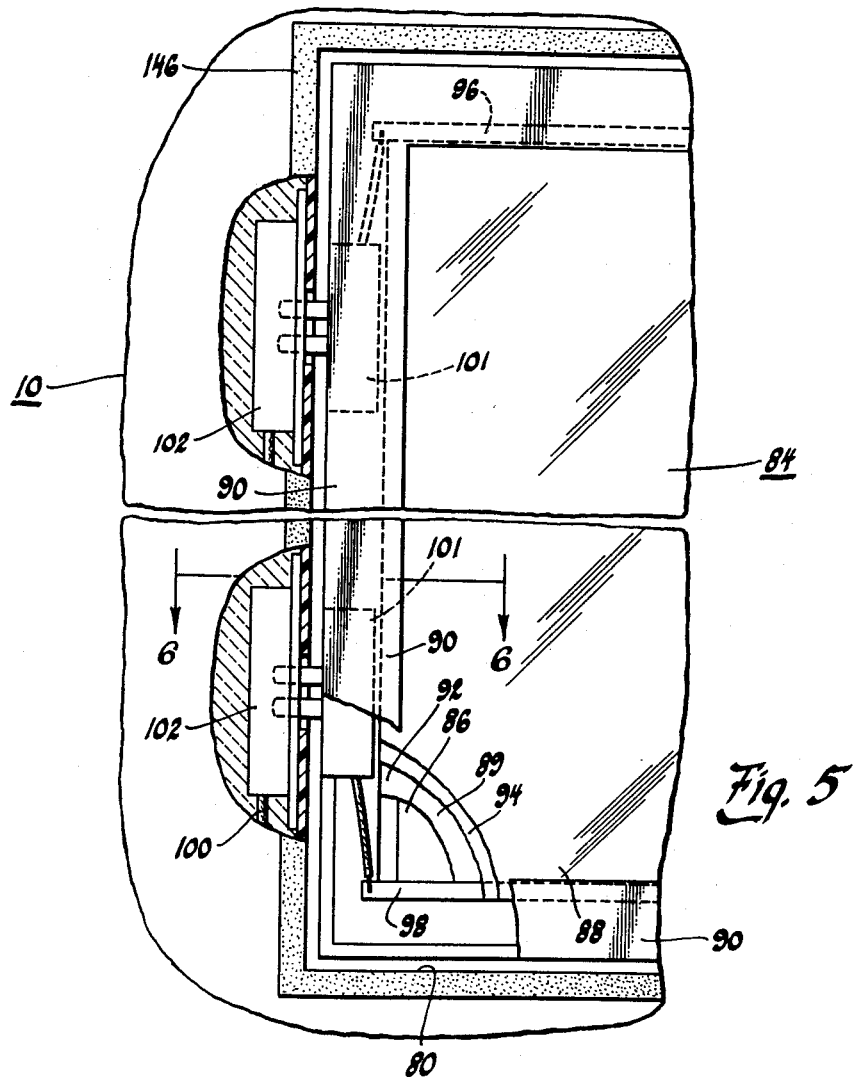
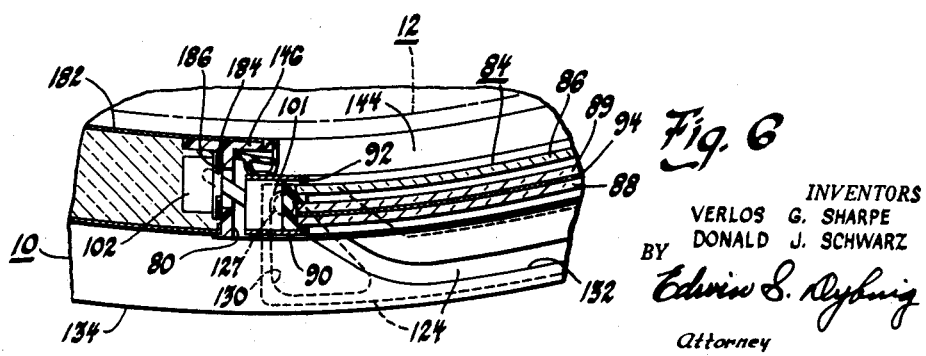
INVENTORS
VERLOS G. SHARPE
DONALD J. SCHWARZ
BY Edwin S. Dybvig
Attorney

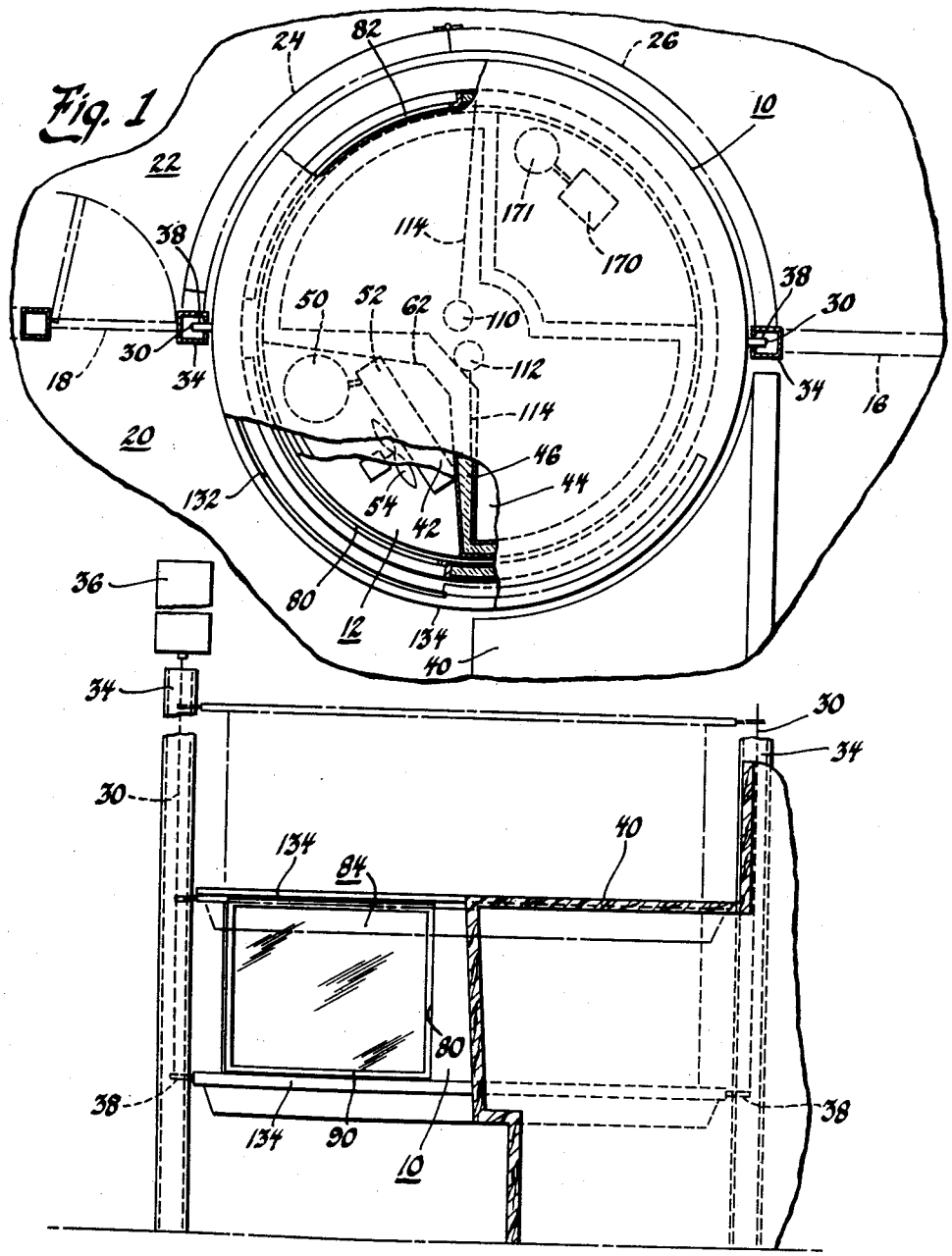

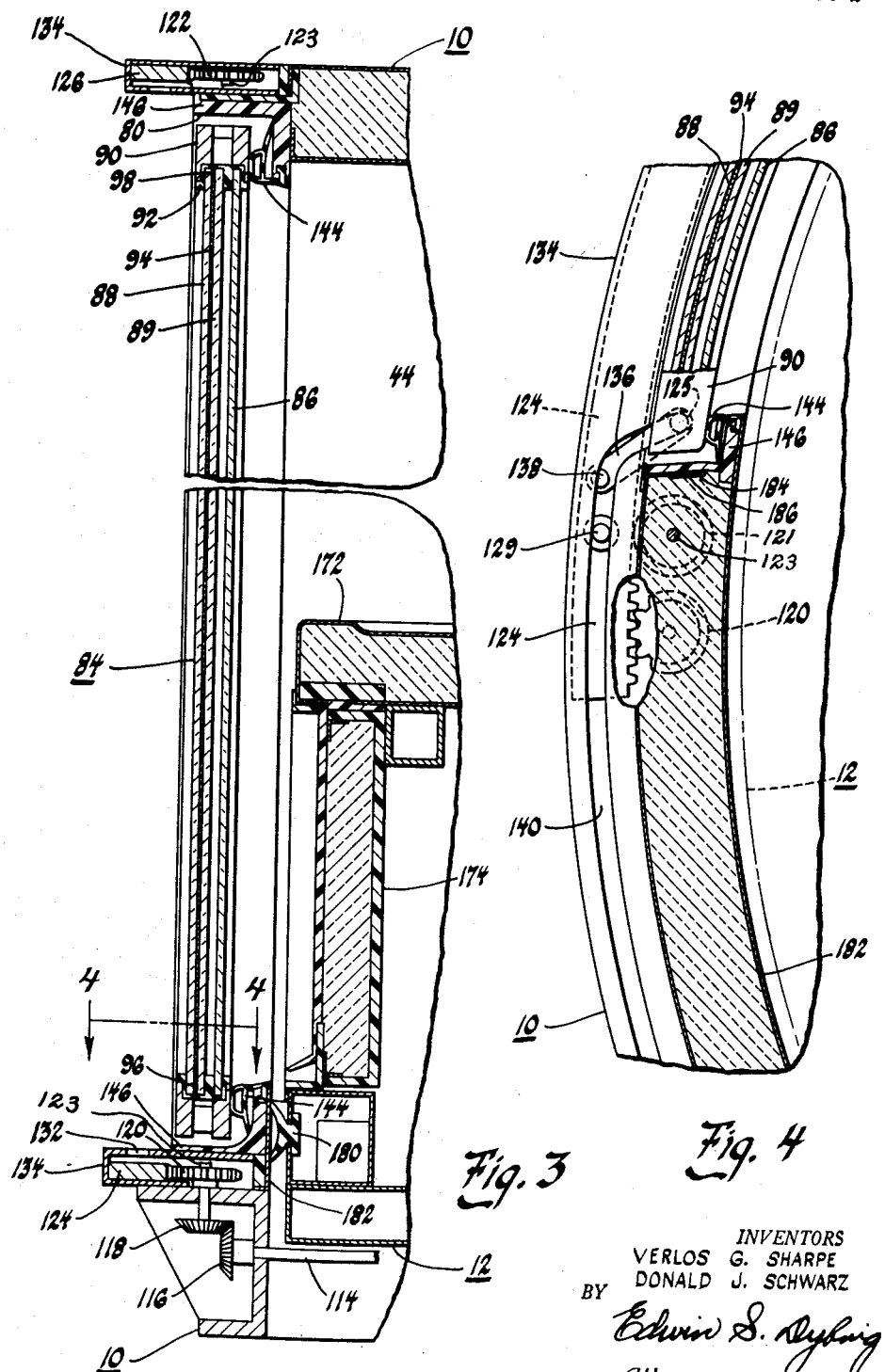

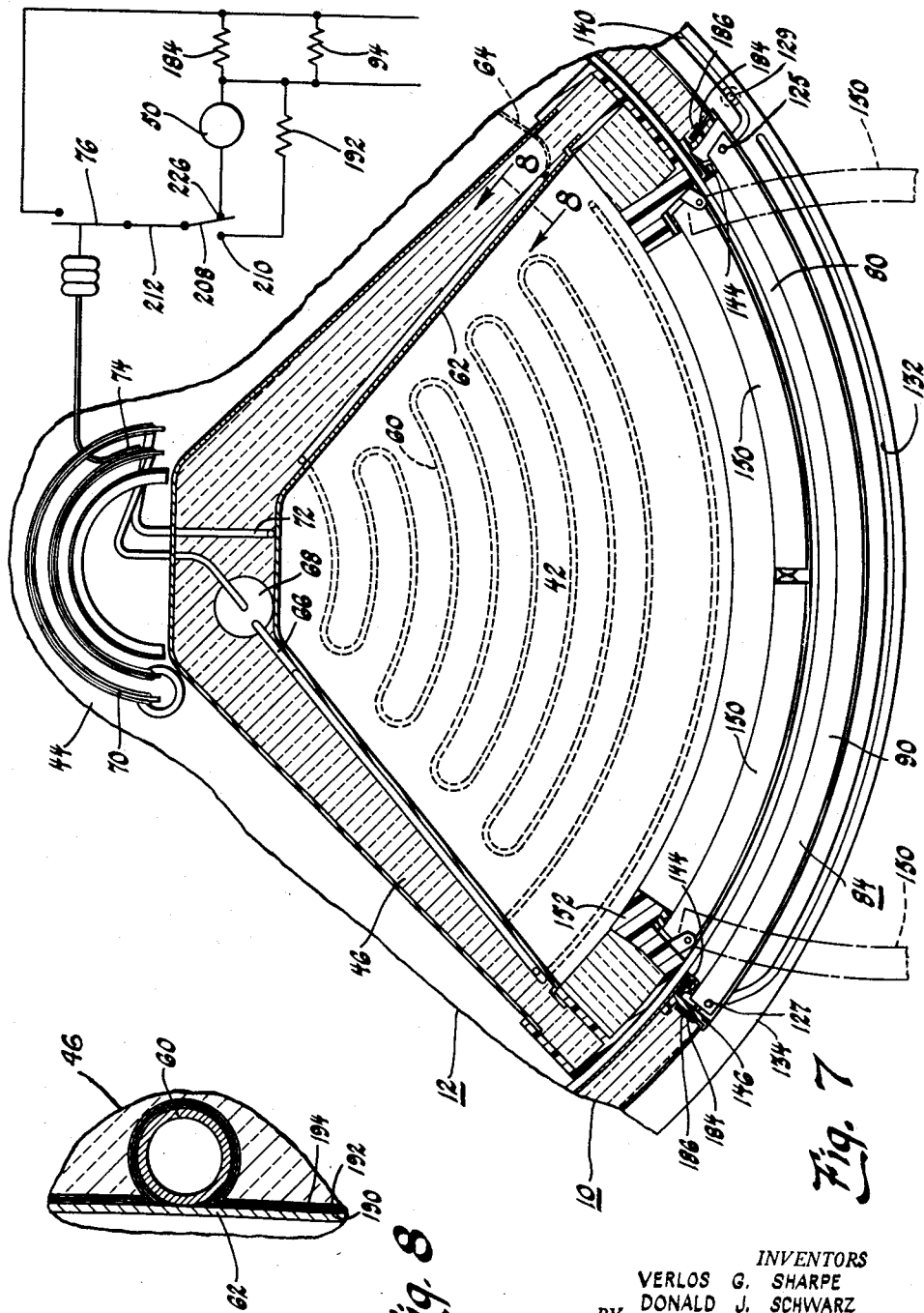

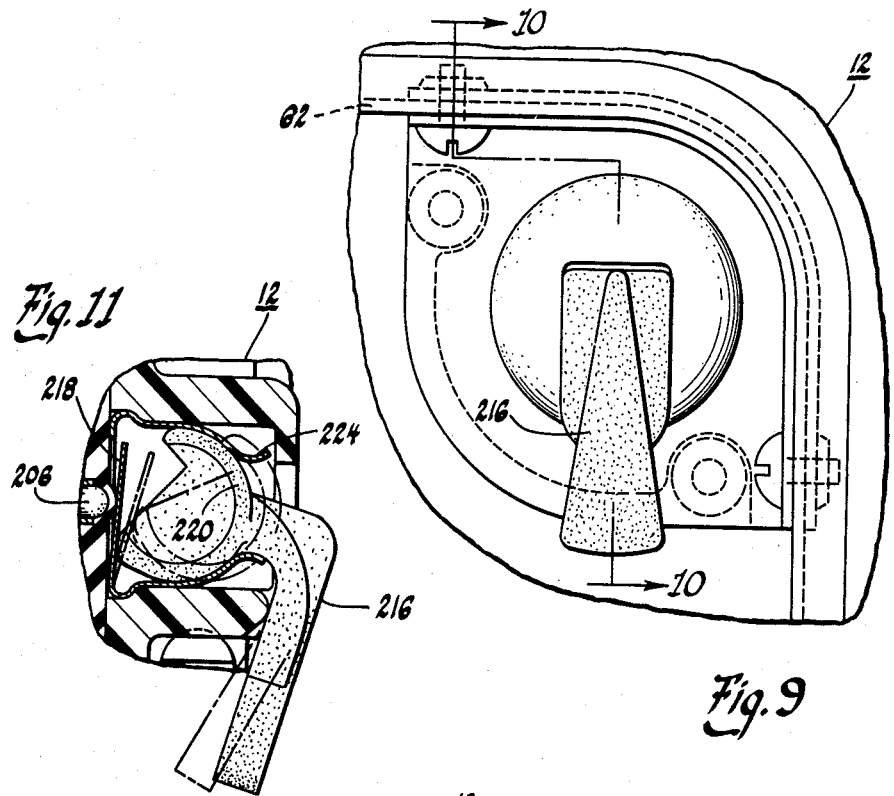
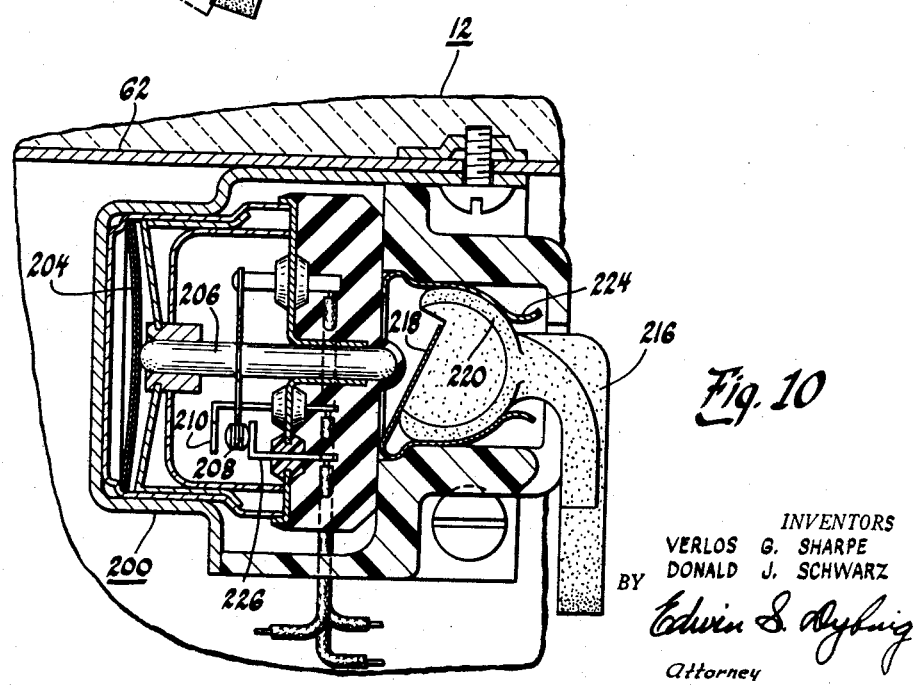

United States Patent Office

3,013,406
Patented Dec. 19, 1961

3,013,406
REFRIGERATING APPARATUS
Verlos G. Sharpe, Xenia, Ohio, and Donald J. Schwarz, Birmingham, Mich., assignors to General Motors Corporation, Detroit, Mich., a corporation of Delaware
Original application Jan. 16, 1956, Ser. No. 559,474. Divided and this application Aug. 19, 1959, Ser. No. 834,859
2 Claims. (Cl. 62—381)

This invention relates to refrigerating apparatus and more particularly to an improved adjustable height, multiple compartment refrigerator for use in preserving foods and the like.

This application is a division of Patent No. 2,927,441, filed January 16, 1956.

It is an object of this invention to provide an improved refrigerator cabinet and door arrangement for facilitating insertion and removal of food.

Another object of this invention is to provide an improved door construction which makes it practical to use glass panels in the door.

A further object of this invention is to provide improved control mechanism for use in refrigerators.

Further objects and advantages of the present invention will be apparent from the following description, reference being had to the accompanying drawings, wherein a preferred form of the present invention is clearly shown.

In the drawings:

FIGURE 1 is a plan view, somewhat schematic, with parts broken away, showing a preferred embodiment of the invention;

FIGURE 2 is a vertical sectional view showing the kitchen cabinet in section and showing the relationship of the refrigerator to the kitchen cabinet;

FIGURE 3 is a fragmentary vertical sectional view showing the construction of the door and door actuating mechanism;

FIGURE 4 is a fragmentary sectional view taken substantially on line 4—4 of FIGURE 3 and showing the door jamb and door actuating mechanism;

FIGURE 5 is a fragmentary front elevational view, with parts broken away, showing the arrangement for making electrical contact with the heated glass door panel;

FIGURE 6 is a fragmentary sectional view taken substantially on line 6—6 in FIGURE 5;

FIGURE 7 is a fragmentary horizontal sectional view showing the construction of the frozen food storage portion of the refrigerator;

FIGURE 8 is a fragmentary sectional view taken substantially on line 8—8 of FIGURE 7 and showing the relationship between the evaporator and the heater used in defrosting the evaporator;

FIGURE 9 is a fragmentary elevational view showing the switch for use in energizing the defrost heater element;

FIGURE 10 is a sectional view taken substantially on line 10—10 of FIGURE 9; and FIGURE 11 is a fragmentary sectional view showing two possible positions of the switch actuator shown in FIGURES 9 and 10.

Referring now to the drawings wherein a preferred embodiment of the invention has been shown, reference numeral 10 generally designates a non-rotatable but vertically adjustable refrigerator housing which is circular in cross-section. The refrigeration equipment is all supported on a rotatable base or core 12 that rotates within the outer housing or shell 10. The refrigerator is adapted to be mounted in an opening in a wall such as the wall 16 which separates the kitchen 20 from the service entrance 22. For purposes of illustration, the wall 16 has been shown provided with a door 18 which connects the kitchen space 20 with the service entrance 22. The arrangement is such that fresh groceries which are to be placed in the refrigerator may be loaded into the refrigerator from the service entrance 22 whereas foods to be used in the preparation of meals may be removed from the refrigerator from the kitchen side 20. In the illustration shown, a door 24 which is preferably provided with a lock (not shown) has been provided in the wall portion 26 which surrounds the refrigerator 10 on the service entrance side of the refrigerator.

In the embodiment shown, the entire refrigerator housing 10 and its contents may be raised and lowered by means of cables 30 which pass through the hollow studs 34 arranged adjacent to the opposite sides of the refrigerator, as shown. The cables 30 are adapted to operated by suitable reversible motor means such as the means 36 shown in FIG. 2. The cabinet 10 is provided with projecting arms 38 which engage the cables 30, as best shown in FIG. 2. When it is desired to use the upper surface of the refrigerator cabinet 10 as a work surface substantially at the same height as the kitchen counter 40, the cabinet 10 will be lowered so as to occupy the position in which it is shown in full lines in FIG. 2 of the drawing, whereas when it is desired to place articles of food in the refrigerator or to remove articles of food from the refrigerator, the motor 36 will be energized so as to raise the cabinet 10 to the dot-dash line position shown in FIG. 2 so as to place the access doors 84 of the refrigerator at a more convenient level.

The refrigerator is of the type which has a frozen food storage compartment 42 insulated from the higher temperature main food storage compartment 44 by means of an insulated wall 46. The bottom wall of the frozen food storage compartment 42 is arranged at a higher elevation than the bottom of the food storage compartment 44 so as to provide space below the frozen food storage compartment for the motor-compressor unit 50, the condenser 52 and the condenser fan 54.

The refrigerating system is of the same general type as that shown in Wurtz et al. Patent 2,672,020, the primary difference being only in the physical shape of the evaporators rather than in the refrigerant circuit. Thus, in the system shown herein the motor-compressor unit 50 discharges the compressor refrigerant vapor into the condenser 52 wherein the compressed vapor is liquefied before being supplied to the freezer compartment evaporator coil 60. The coil 60 is of the type which is wrapped around the metallic liner 62 which forms the inner walls of the frozen food storage compartment 42. A fixed restrictor 64 is provided in the line which leads from the condenser 52 to the freezer compartment evaporator 62 so as to reduce the pressure of the refrigerant entering the evaporator 60 in accordance with well-known practice. The excess liquid refrigerant leaves the evaporator coil 60 through the line 72 which connects to the inlet of a plate-type evaporator 70 located in food storage compartment 44. For purposes of illustration, the evaporator 70 has been shown constructed in two arcuate shaped sections with the two sections arranged in side-by-side relationship within the compartment 44, as best shown in FIG. 7. The vaporized refrigerant leaving the evaporator 70 flows through the accumulator 68 and then leaves by line 66 which returns the vaporized refrigerant to the motor-compressor unit 50.

The main control for the refrigerating system includes a thermostat 74 located on the plate evaporator 70 and is arranged to operate a switch 76 which controls the starting and stopping of the motor-compressor unit 50 so as to cause defrosting of the evaporator 70 during each "off" cycle, in the manner more fully explained in the above-mentioned Wurtz application. In view of the fact that the construction of the refrigerating system may be varied considerably without departing from the spirit of the invention, it is not believed necessary to describe the particular refrigerating system shown herein in greater detail.

The refrigerator cabinet 10 is provided with a pair of door openings 80 and 82 which are arranged on opposite sides of the partition 16, as best shown in FIG. 1 of the drawing. Each of the openings is provided with an arcuate glass paneled door 84. This door consists of an inner glass panel 86 and a double outer glass panel 88, 89 which is spaced from the panel 86, as best shown in FIG. 3 of the drawing. The outer edges of the panels 86, 88 and 89 are held in place by means of a suitable frame 90 which carries a sealing gasket 92 which prevents the passage of air into the space between the glass panels as well as preventing the leakage of air between the edges of the glass and the frame 90 into the refrigerator compartment.

The outer panel is a three-ply panel in which the middle ply 94 is a metallic oxide film which serves as a heating element for maintaining the adjacent glass panels 88, 89 heated at all times so as to prevent moisture from the relatively warm and humid room air from condensing on the glass. Buss bars 96 and 98 are arranged at the bottom and top of the glass panel 88, 89 so as to supply current to the upper and lower edges of the heating element 94. Metallic oxide films of this type are now well known commercially and need no further description.

The buss bar 96 is connected to a powerl ine 100 by means of the plug 101 and socket 102. It will be noted that the plug 101 is incorporated in the framework 90 of the door, as best shown in FIGS. 5 and 6 of the drawing, whereas the socket 102 is provided in the stationary part of the refrigerator housing.

For purposes of illustration, the doors 84 have been shown as power operated doors which may be opened and closed by means of electric motors 110 and 112 (see FIG. 1). The door operating mechanism is similar for each of the doors 84 and consequently, only the one needs to be described. Each of the motors operates a drive shaft such as the shaft 114 shown in FIGS. 1 and 3. This drive shaft is provided with a pinion 116 at its outer end which meshes with a complementary pinion 118 which in turn drives a set of door operating gears 120, 121 and 122 located as shown in FIGS. 3 and 4 of the drawing. The gears 120 and 122 operate arcuate rack elements 124 and 126, respectively. The gear 120 is mounted on the same shaft which carries the pinion 118 and serves to operate the lower rack 124. The rack 124 drives the gear 121 which is mounted on the lower end of shaft 123. The gear 122 is secured to the upper end of the shaft 123 so as to cause the racks 124 and 126 to operate in unison. The shaft 123 has been broken away in FIG. 3 of the drawing so as not to obscure the showing of the door 84. The rack elements are so constructed and arranged that upon energization of the door operating motor 112, they move in an arcuate path for actuating the doors through pins 125 and 127 which project from the edges of the doors. Each door 84 is provided with a set of downwardly projecting pins 125 and 127 (see FIGS. 4 and 6) and a similar set of upwardly projecting pins 125 and 127 which are actuated by the rack 124. Thus, each of the pins 127 projects into a triangularly shaped cam slot 130 in the one end of the racks 124 and 126 (see FIG. 6), and also through a separate guide slot 132 provided in the rack guides 134 located directly above and below the door opening. The pin 125 is pivotally connected to a link 136 (see FIG. 4) which has its one end pivotally secured to a pin 138 carried by the rack 124. The rack 124 has secured thereto a guide pin 129 which projects through the slot 140. By virtue of the above-described arrangement, operation of the motor 112 will cause rotation of the shaft 114 which in turn drives the gears 120 and 122 so as to cause movement of the racks 124 and 126. It will be noted that the pin 129 is guided in its movement by the cam slot 140 which is also provided in the rack guides 134. The guide slots 132 and 140 are so designed that upon energization of one of the door operating motors, the associated refrigerator door 84 will first move radially outwardly out of contact with the door seal 144 carried by the breaker strip 146 and then move clear of the door frame or breaker strip 146 before it moves any appreciable distance in the circumferential direction.

It will be noted from FIG. 6 that as the door 84 moves out of sealing engagement with the sealing strip 144, the electrical connections will be broken at the plug 101 and socket 102. However, upon reclosing of the door the electrical connection will be reestablished so as to maintain the outer glass panel at a temperature high enough to prevent condensation of moisture thereon.

Insofar as certain aspects of this invention are concerned, any other type of door actuating mechanism could be used, likewise, the arrangement for preventing condensation on the doors could be used equally well in conventional doors having transparent windows therein.

As best shown in FIG. 7 of the drawing, the frozen food storage compartment 42 is provided with a pair of inner doors 150 which are carried by a door frame 152 which is fixed relative to the frozen food storage compartment 42. By virtue of this construction, it is obvious that the inner doors 150 are movable with the central core 12 of the refrigerator so as to enable one to gain access to either the frozen food storage compartment or the main food storage compartment through either one of the doors 84 carried by the fixed outer shelf of the refrigerator. A motor 170 which operates mechanism 171 has been provided for automatically causing rotation of the central core of the refrigerator upon energization of the motor. Electrical circuit and switches used for energizing the motor 170 have not been shown as circuits of this type are well known. The motor 170 would preferably be of the reversing type whereby the direction of rotation of the rotatable core can be changed, depending upon the direction of rotation of the motor 170. The motor 170 as well as the condensing equipment are mounted beneath the insulated floor 172 of the refrigerated space. As best shown in FIG. 3 of the drawing, access may be had to the apparatus mounted beneath the floor 172 through an insulated removable panel 174. In order to obtain access to the machinery compartment, it is, of course, first necessary to so rotate the core of the refrigerator to a position in which the removable panel 174 will be in alignment with one of the doors 84. Suitable seal means 180 (see FIG. 3) is provided between the lower edge of the rotatable core 12 and the inner wall 182 of the stationary outer cabinet 10.

One of the problems in designing a refrigerator is that of preventing condensation of moisture from the relatively warm room air onto the door frame or breaker strip 146 which surrounds the refrigerator doors 84. In the refrigerator shown, the breaker strip 146 is constructed of a molded plastic material having electrical insulating properties as well as heat insulating properties, and a coating of conducting material 184 is sprayed onto the outer surface of the breaker strip 146 and this is in turn protected by means of an insulating coating 186 which shields the conductor material 184. Current is then passed through the coating material 184 so as to cause heating of the breaker strip at the point where condensation would otherwise form. By virtue of the fact that the heater material 184 is of the type which is sprayed on, it is possible to apply the heater to an irregularly shaped breaker strip. Furthermore, the heater need not be handled as a separate element on the assembly line as it is carried directly by the breaker strip much like a coating of paint.

In view of the fact that frost tends to accumulate on the inner wall 62 of the frozen food storage compartment 42, it is desirable to provide means for applying heat to this wall for defrosting purposes. In the past, it has been conventional practice to use strip heaters lying adjacent the outer surface of the inner wall 62, but strip heaters of this type tend to localize the heating to the point of contact between the strip heater and the wall 62. It has been found that a lower temperature can be used for defrosting the frozen food compartment liner if it is possible to uniformly heat all portions thereof. In order to accomplish such uniform heating a sprayed-on type of heating element has been employed. As shown in FIG. 8 of the drawing, the heating element consists of an insulating layer 190 which is first sprayed onto the entire outer surface of the inner wall 62, as well as the outer surface of the refrigerant line 60. A conducting layer 192 is then sprayed onto the insulating layer 190 and this, in turn, is protected by a second insulating layer 194 which protects the conducting material 192. Electrical connections are then made to the layer 192 at spaced points, in accordance with well known practice, so as to cause the layer 192 to be heated.

The application of current to the heating material 192 is controlled by a manually reset thermostat element generally designated by the reference numeral 200. This thermostat element includes a conventional Spencer thermostat disc 204 of bimetallic material which serves to actuate a switch operating plunger 206 which, in turn, actuates a switch contact 208. As best shown in FIGS. 7, 9, 10 and 11 of the drawing, the contact 208 is adapted to engage a stationary contact 210 connected to the defrosting heater element 192 so that whenever the contact 208 is manually moved into engagement with the contact 210 defrosting will take place and the circuit to the motor-compressor unit will be broken at contact 226. The switch actuator 206 is moved to the defrost position by means of the manual operator 216 which is normally held in the full-line position shown in FIG. 10 by means of a spring 218. It will be noted that the manual operator 216 includes a spherical portion 220 which normally rotates in the spring socket 224 from the full-line position shown in FIG. 10 to the full-line position shown in FIG. 11. Due to variations in manufacturing tolerances, it sometimes happens that it is necessary to move the actuator 216 further in some cases than in others, and in order to prevent excessive strain on those switch mechanisms which do not require as much movement as others, the spring socket 224 is arranged so as to allow an operator to move the member 216 from the full-line position shown in FIG. 11 to the dot-dash line position shown in FIG. 11 without exerting excessive force on the plunger 206. The Spencer thermostat disc 204 is arranged so as to respond to changes in temperature of the frozen food storage compartment liner 62. The thermostat is so calibrated that whenever the temperature of the liner 62 reaches the temperature of 50° F. or higher, the circuit to the defrosting heater will automatically be opened. Upon opening of the circuit to the defrost heater, the contact 208 moves into engagement with a contact 226 which is arranged in the circuit for the motor-compressor unit 50. By virtue of the above-described arrangement, it is obvious that the defrost control switch automatically opens the circuit to the motor-compressor unit whenever the circuit is closed to the defrost heaters so as to stop operation of the refrigerator during the defrost period.

The use of a sprayed on type of heater element enables one to place the heater element in intimate contact with an irregularly shaped surface and to spread the heat uniformly over the entire surface to be heated whereby the heater not only operates more efficiently but also may be operated at lower temperatures than would otherwise be possible. This is especially important in refrigeration equipment.

While the form of embodiment of the invention as herein disclosed constitutes a preferred form, it is to be understood that other forms might be adopted, as may come within the scope of the claims which follow.

What is claimed is as follows:

1. In a refrigerator, means forming the top, bottom and side walls of a cabinet, means separating said cabinet into a frozen food storage compartment and a second food storage compartment for unfrozen foods, a first evaporator arranged to cool said frozen food storage compartment, a second evaporator disposed within said cabinet for cooling said second food storage compartment, means for supplying liquid refrigerant to said evaporators, an opening in said side wall, means for selectively rotating said frozen food storage compartment and said second compartment into alignment with said opening, and a door in one wall of said frozen food storage compartment movable into alignment with said opening.

2. In a refrigerator, the combination, means forming an insulated food storage compartment having a non-rotatable outer cabinet portion provided with a service entrance door through which foods to be refrigerated may be inserted into said compartment and having a dispensing outlet door through which foods may be removed from said compartment, a horizontally disposed rotatable food support in said compartment, means for refrigerating said compartment carried by said rotatable food support so as to rotate therewith, and an insulated frozen food storage compartment carried by said rotatable support and having an inner access door selectively movable into alignment with either said service entrance door or said dispensing outlet door.

References Cited in the file of this patent

UNITED STATES PATENTS

| | | |
|---|---|---|
| 153,307 | Blaisdell | July 21, 1874 |
| 478,898 | Westwood | July 12, 1892 |
| 1,975,823 | Alden | Oct. 9, 1934 |
| 2,201,411 | Smith | May 21, 1940 |
| 2,447,606 | Wine | Aug. 24, 1948 |
| 2,579,379 | Fritsche | Dec. 18, 1951 |
| 2,596,316 | White | May 13, 1952 |
| 2,627,445 | Lyon | Feb. 3, 1953 |
| 2,701,746 | Piggott | Feb. 8, 1955 |
| 2,811,405 | Formoso | Oct. 29, 1957 |